(12) United States Patent
Koch et al.

(10) Patent No.: US 7,581,560 B2
(45) Date of Patent: Sep. 1, 2009

(54) CHECK VALVE

(75) Inventors: Reinhard Koch, Wachenroth (DE);
Rainer Fuhrmann, Waischenfeld/Nankendorf (DE);
Christian Degenhardt, Clausthal-Zellerfeld (DE); Bernd Stange, Osterode (DE)

(73) Assignees: Schaeffler KG, Herzogenaurach (DE); IFT GmbH, Clausthal-Zellerfeld (DE)

( * ) Notice: Subject to any disclaimer, the term of this patent is extended or adjusted under 35 U.S.C. 154(b) by 45 days.

(21) Appl. No.: 11/146,579

(22) Filed: Jun. 6, 2005

(65) Prior Publication Data
US 2006/0021661 A1    Feb. 2, 2006

(30) Foreign Application Priority Data
Jul. 8, 2004    (DE) .................. 10 2004 033 022

(51) Int. Cl.
*F16K 15/02* (2006.01)
(52) U.S. Cl. .............. 137/543.19; 137/513.3; 137/513.5; 137/543.21
(58) Field of Classification Search ............. 137/513.3, 137/513.5, 513.7, 543.19, 543.21
See application file for complete search history.

(56) References Cited

U.S. PATENT DOCUMENTS

| | | | | |
|---|---|---|---|---|
| 1,710,635 A | * | 4/1929 | Wertz | 137/543.19 |
| 1,938,418 A | * | 12/1933 | Evans | 137/514.3 |
| 1,953,130 A | * | 4/1934 | Prellwitz | 137/516.21 |
| 1,959,644 A | | 5/1934 | Richardson | |
| 2,623,725 A | * | 12/1952 | Sands | 137/516.25 |
| 2,649,277 A | * | 8/1953 | Blackford | 137/515.5 |
| 2,904,065 A | * | 9/1959 | Butlin | 137/454.4 |
| 2,918,083 A | | 12/1959 | Clark, Jr. et al. | |
| 3,006,364 A | * | 10/1961 | Osborn | 137/538 |
| 3,524,469 A | * | 8/1970 | Jebe | 137/543.19 |
| 3,595,265 A | * | 7/1971 | Cryder et al. | 137/513.5 |
| 3,830,255 A | * | 8/1974 | Freiheit | 137/543.19 |
| 3,871,175 A | * | 3/1975 | Yamamoto | 60/307 |
| 3,913,615 A | * | 10/1975 | Cooper | 137/543.19 |
| 4,265,271 A | * | 5/1981 | Rosaen et al. | 137/540 |
| 4,700,741 A | * | 10/1987 | Murphy | 137/543.19 |
| 4,766,930 A | * | 8/1988 | Patti | 137/540 |
| 5,193,579 A | * | 3/1993 | Bauer et al. | 137/540 |
| 6,117,312 A | * | 9/2000 | Mees et al. | 210/130 |
| 6,435,848 B1 | * | 8/2002 | Minami et al. | 417/440 |

FOREIGN PATENT DOCUMENTS

| | | |
|---|---|---|
| DE | 70 45 248 | 12/1970 |
| DE | 2 307 212 | 8/1973 |
| DE | 100 59 954 | 6/2002 |
| EP | 0 485 335 | 5/1992 |
| FR | 2 659 412 | 9/1991 |

* cited by examiner

*Primary Examiner*—Kevin L Lee
(74) *Attorney, Agent, or Firm*—Jordan and Hamburg LLP

(57) ABSTRACT

A check valve includes a housing with an inlet opening and an outlet opening along with a cage-like insert disposed therein as a support for a spring element and for guiding a closing body which can be moved against the spring element and which can be moved between a first end position, in which the spring body lies in contact with a seat to form a seal, and a second end position, in which the valve is completely open. The closing body, which is constructed cylindrically and pot-like, is guided with its cylindrical casing surface at the cage-like insert and in contact with the seat with a flat outer surface.

20 Claims, 4 Drawing Sheets

CHECK VALVE

BACKGROUND OF THE INVENTION

The invention relates to a check valve, comprising a housing with an inlet opening and an outlet opening, with a cage-like insert disposed therein as a support for a spring element and for guiding a closing body, which can be moved against the spring element and can be moved between a first end position, in which it lies in contact with a seat, forming a seal, and a second end position, in which the valve is completely open.

Such a check valve is used wherever liquids must be prevented from flowing through in one direction. Such valves are used, for example, in engines, in which they are connected in the oil cycle.

A known check valve comprises a housing, into which the liquid may enter and from which it may emerge. In the interior of the housing, there is a cage-like insert, which is frequently constructed in the form of a trihedral, which has a support for a spring element, usually a spiral spring, which is disposed centrally and parallel to the axis in the valve housing and which forces the closing body in the form of a metal ball against the seat in the region of the inlet opening. When the pressure at the inlet opening is sufficiently high, the ball is moved against the restoring force of the spring, so that the valve opens up, the degree of opening depending on the hydraulic pressure or flow existing. As described, the ball is guided at the cage-like insert, which usually has three guiding surfaces parallel to the axis. Because of its shape, the ball lies in contact with the guiding surfaces of the insert with only a very small surface. To ensure a high flow cross-section, the guiding surfaces are dimensioned relatively narrow, so that a certain radial movement is possible.

SUMMARY OF THE INVENTION

It is an object of the invention to indicate a check valve, the closing body of which does not tend to vibrate dynamically in operation and which permits a defined opening and closing of the valve.

Pursuant to the invention, this objective is accomplished for a check valve of the type named above owing to the fact that the cylindrical closing body, which is constructed pot-like or plate-shaped, is guided with its cylindrical casing surface at the cage-like insert and, preferably with a flat surface, lies is in contact with the seat.

According to a first alternative of an embodiment, the closing body advantageously is constructed as a cylindrical pot, that is, as a component with a thin wall, which, in comparison to a ball, which is machined from a solid material, has significantly less mass. This means that significantly less mass has to be moved for opening and closing, so that these processes can take place more quickly and in a defined manner. The closing body is guided with its cylindrical section at the cage-like insert, the guiding or contacting surface being relatively large and dependent on the length of the cylindrical section. Because of the low mass, a very rapid opening and closing of the valve is possible. Because of the exact and stable guidance of the closing body, the radial vibrations of the closing body are clearly reduced.

Pursuant to the invention, the sealing function is realized by means of the pot-like closing body, which lies with its flat outer surface in the region of its bottom over a large area in contact with the seat. A large sealing surface is therefore realized, which is not the case with a ball, for which, due to its shape, only a relatively narrow ring-shaped contacting region is realized at the seat.

A further appreciable advantage of the use of a pot-like closing body lies therein that the spring engages the inside of the bottom of the closing body. Therefore, if the length of housing is the same as that of a ball-type embodiment, the spring length of the inventive check valve is significantly greater. This makes it possible either to shorten the housing and to use as spring with a length, similar to that used for the ball-type embodiment, so that the total structural space of the check valve can be reduced hereby. Alternatively, the possibility exists of integrating differently designed springs, depending on the application, since, because of the appreciable length of the spring, there are sufficient possibilities for variation by adapting to the operating conditions. A further appreciable advantage of the use of the pot-like closing element lies therein that, since this spring, as described, engages at the bottom in the interior of the pot, tilting during the movement of the closing body is not possible, which is not that case with a ball, which is supported from the rear by the spring.

Alternatively to the pot-shaped form, the closing body may also be constructed as a solid, cylindrical plate, which is guided at the insert appropriately by the cylindrical casing surface. The central advantages named are also achieved with this embodiment.

A specially appropriate further development of the invention provides that the bottom surface of the closing body, no matter of what construction, is provided with a deformation, over which the spring element, which is constructed, as described, as a spiral spring, is centered. This deformation thus holds the spring element in the central position, parallel to the axis. Moreover, the deformation may either be a bead, pointing to the interior of the closing body, or an outwardly pointing camber.

In order to enlarge the cross-section of the passage in the region of the closing body, it is possible to slot the cylindrical section of the pot-like closing body one or more times. The slots may extend parallel to the axis or also at an angle to the axis. When the pot-like closing body is opened, the fluid, which is already in the region of the cylindrical section, can flow inward through these slots, so that, as a whole, the cross-section of the passage and, with that, the amount of liquid conveyable when the valve is opened, can be increased. This is also taken into account by the distinguishing feature of bending the free end of the cylindrical section of the pot-like closing body a little to the inside. This applies for a closing body with the closed cylindrical section as well as for a closing body with a slotted cylindrical section.

The closing body itself advisably is formed from a metal, especially, in the case of a pot-like closing body, from a deep-drawn sheet metal. On the one hand, this makes a sufficiently light, uniform but also stable construction possible. Such a closing body can withstand high temperatures and is inert to the usual media flowing through it. Likewise, it can be produced relatively inexpensively. Aside from the closing body itself, the cage-like insert and the housing itself may also, of course, be constructed from metal, so hat that an entirely metal construction results. Alternatively to such a metal construction, the closing body may also be made from a plastic, a choice of the plastic used optionally depending on the use for which the valve is intended, depending on which the valve must optionally be resistant to high temperatures, as well as optionally to aggressive media flowing through. For this embodiment also, the possibility exists of producing the cage-like insert and the housing itself also from plastic. In other words, any combination of materials may be selected. However, the material selected must match the requirements.

Further advantages and details of the invention are explained by means of preferred examples, with reference to the FIGS. The FIGS. are diagrammatic representations.

DESCRIPTION OF THE PREFERRED EMBODIMENTS

Figure 1:
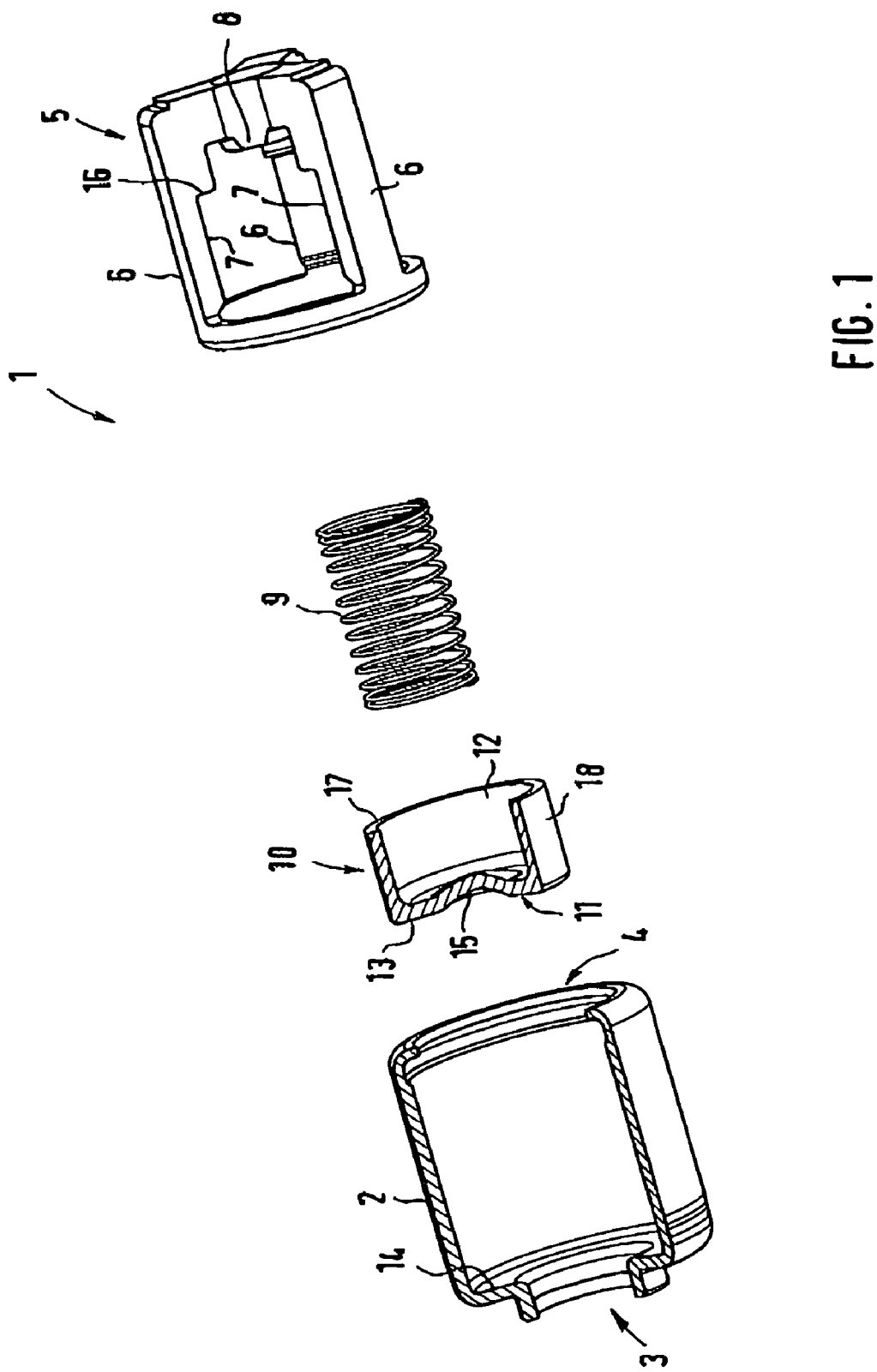
FIG. 1 shows an exploded diagram of the inventive check valve, partially in section.

FIG. 1 shows the inventive check valve 1 in the form of an exploded representation. Shown here in section is the housing 2, preferably of metal, which has an inlet opening 3 and an outlet opening 4 and is connected in the fluid cycle. A cage-like insert 5, which preferably is made from plastic, is disposed in the interior of the housing. It is constructed in the form of a trihedral and has three guiding sections 6. In the installed position, the guiding surfaces 7 of the insert 5 are parallel to the axis. Instead of a trihedral, dihedral or polyhedral constructions of the cage are also conceivable. Between the guiding sections 6, there is a space for the passage of the fluid. Furthermore, a support 8 for the spring element 9, which is in the form of a spiral spring here, is provided at the insert 5 which, at the same time, serves to center the spring element 9. Furthermore, a closing body 10 is provided, which can be moved in the interior of the insert 5. It is constructed pot-like and cylindrically and has a bottom 11, as well as a cylindrical section 12 protruding therefrom. A flat sealing surface 13 is realized at the bottom 11 and, in the closed position, interacts with a flat sealing surface 14 at the housing 2, which forms a seat. Above this, a two-dimensional mating seal is realized. The bottom 11 furthermore is provided with a deformation 15 in the shape of a bead, which serves to center the spring element 9, which engages the inner side of the bottom 11.

The cylindrical section 12 is dimensioned shorter than the length of the guiding surfaces 7 at the insert 5 up to the stop 16 provided there, at which the front edge 17 of the closing body 10 is stopped at the cylinder section 12 in the open, end position. Above the cylinder casing surface 18, the cylinder section 12 lies in contact with the guiding surfaces 7 of the guiding sections 6 of the insert 5 or is guided over this cylinder casing surface 18 at the guiding surfaces 7. The closing body 10 therefore lies in contact with the respective guiding section 7 over a relatively large area or an appreciable length.

Figure 2:
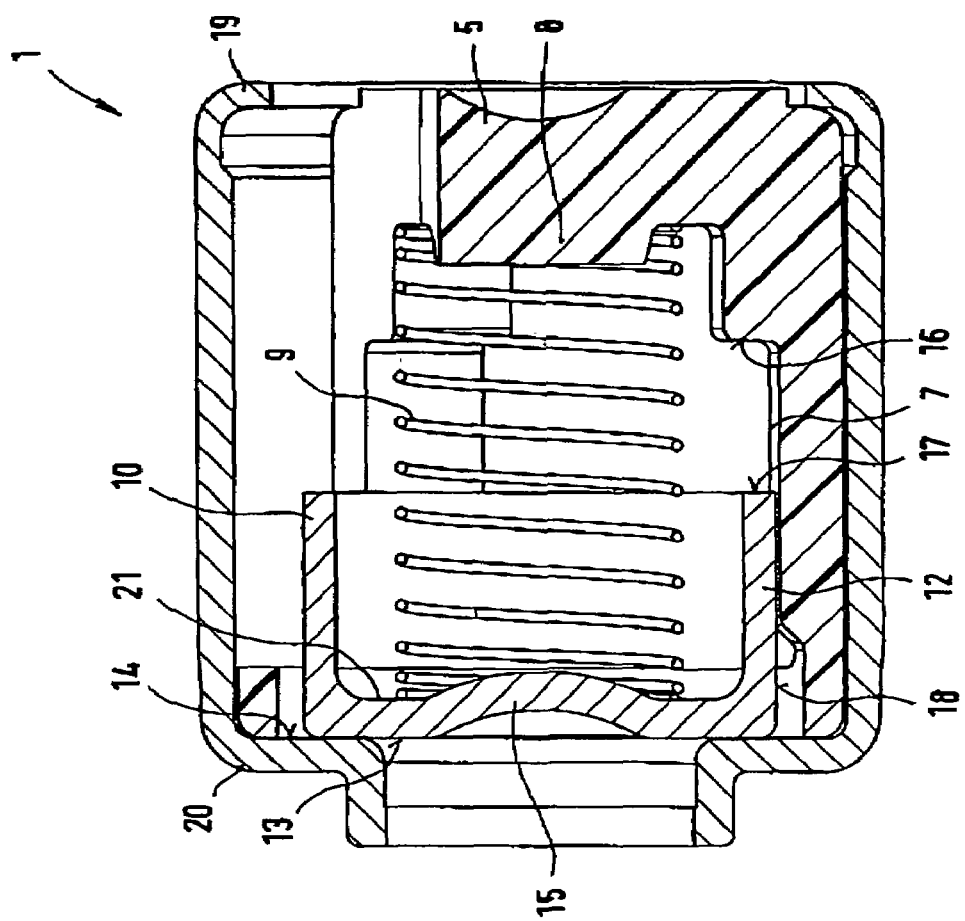
FIG. 2 shows a sectional view of the assembled check valve

FIG. 2 shows the inventive check valve 1 in the assembled state. As described, the spring element 9 is supported at the support 8 of the insert 5, which is fixed to the bottom 19 of the housing and at the opposite wall 20 of the housing. With the other end, the spring element 9 is in contact with the inner side 21 of the bottom 11 of the closing body 10. The latter is thus supported in the region of its plate-shaped bottom. Evidently, the deformation 15 centers the spring element 9 and holds it in a position parallel to the axis.

Because the cylinder casing 18 is guided over a large area at the guiding surfaces 7, on the one hand, radial movement is prevented and, in conjunction with the support of the spring element 9 at the bottom 11, tilting is also prevented. An exact guidance of the closing body 10, which preferably consists of a deep-drawn sheet-metal part and consequently has a very slight mass, between the two end positions, which are defined by the contact of the sealing surface 13 with the seating surface 14 (valve closed) as well as the contact of the front edge 17 at the stop 16 (valve open), enables the closing body to be moved very rapidly and in a defined manner between the two end positions, without running the danger that dynamic vibrations are realized.

Evidently, the length of the spring is appreciably large, since the spring, as it were, lies in contact with the interior of the pot. The possibility exists of shortening the length of the housing, optionally in conjunction with a shortening of the axial length of the cylinder section, and of reducing in this way the whole of the module space.

Figure 4:
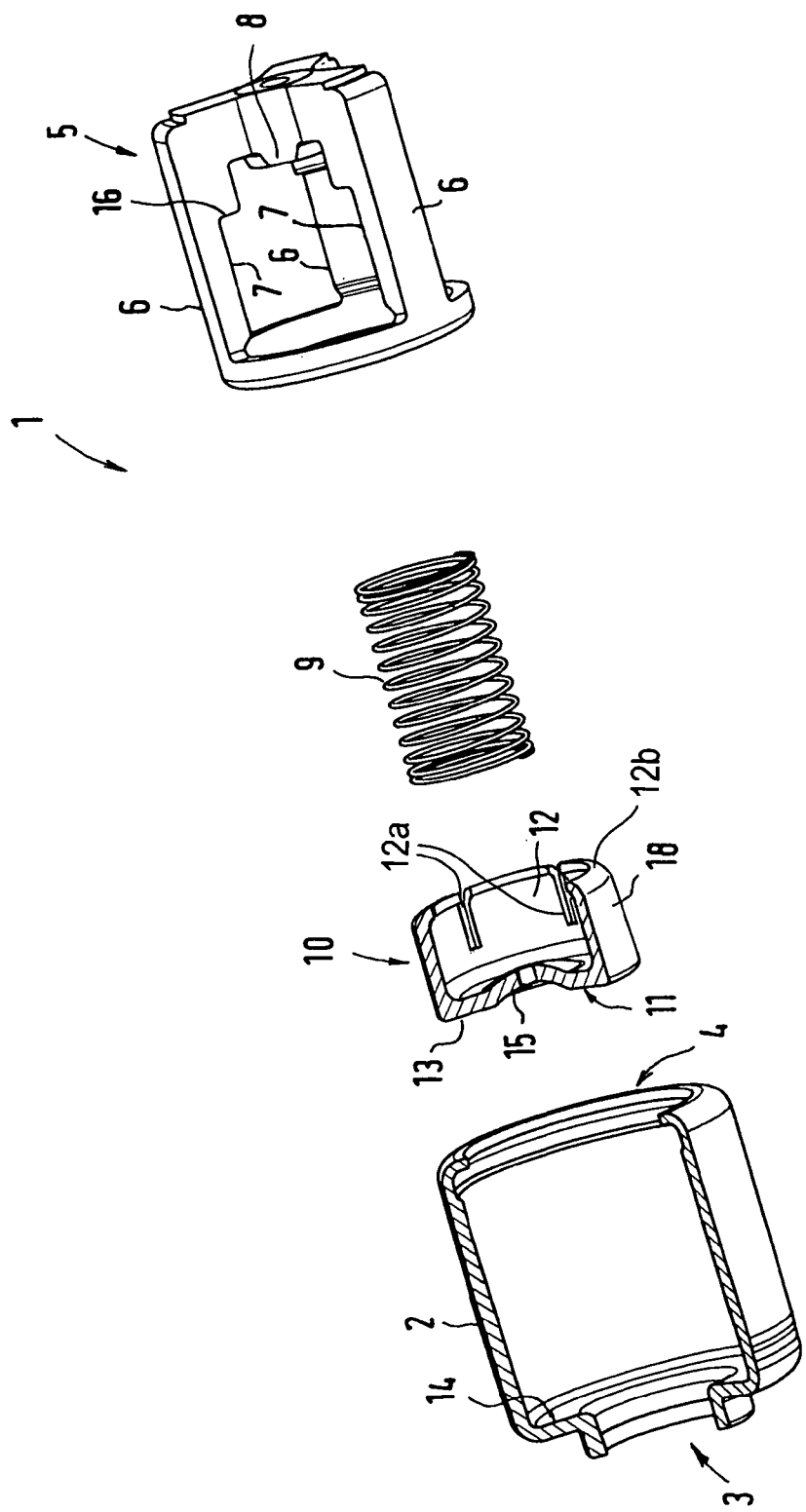
FIG. 4 shows an exploded diagram of another embodiment of the inventive check valve, partially in section.

Alternatively to the embodiment of the deformation 15 as an inwardly directed bead, the possibility exists of realizing the deformation as an outwardly directed camber. In this case also, a centering function exists. Furthermore, turning now to FIG. 4, the possibility exists of providing the cylindrical section 12 with slots 12a, which may extend parallel (as depicted) or inclined at an angle to the axis, in order to enlarge the cross-section of the passage. For this purpose, the possibility also exists of bending the free end 12b of the cylindrical section 12, that is, in the region of the front edge 17, inward into the interior of the pot, in order to facilitate in this way the intake of liquid to the outlet opening 4.

Figure 3:
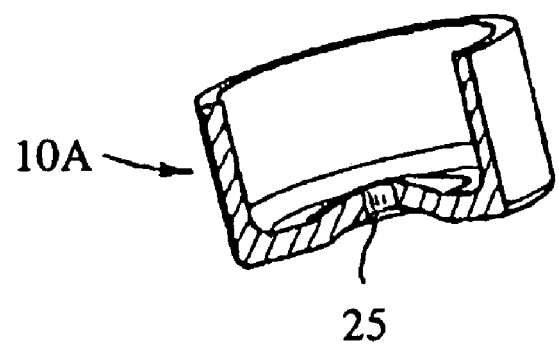
FIG. 3 shows a partial sectional view of a closing body according to an alternative embodiment of the invention.

Furthermore, in an alternative embodiment illustrated in FIG. 3, the valve includes a closing body 10A in place of the disclosed closing body 10. The closing body 10A has the same features as the closing body 10 and further includes an opening 25 in the outer surface of the closing body 10A for enabling throttled flow when the valve is closed.

Furthermore, it is possible to use, instead of the pot-like closing body, a cylindrical, panel-shaped closing body, which optionally is provided with a centering bead. The closing body is also guided with its cylindrical casing surface, which is dimensioned somewhat shorter because of its solid construction, at the cage-like insert.

The invention claimed is:

1. A check valve, comprising:

a housing of integral construction including a wall at a first end defining an inlet opening, a bottom end at a second end opposite to said first end defining an outlet opening and a housing seat disposed adjacent to the inlet opening;

a spring element and a closing body;

a cage insert being disposed within the housing and extending substantially between the wall defining said inlet opening and the bottom end defining said outlet opening, said cage insert supporting the spring element and guiding the closing body;

the closing body including a flat outer surface contactable with the housing seat, said closing body being moveable against the spring element between a first end position, in which the closing body contacts the housing seat to form a seal, and a second end position in which the valve is completely open; and the closing body being formed pot-shaped including a cylindrical section presenting a cylindrical casing surface, said closing body being guided with the cylindrical casing surface within the cage insert, said cage insert including at least one opening in a side thereof facing said cylindrical casing surface.

2. The check valve of claim 1, wherein a bottom surface of the closing body has a deformation for centering the spring element.

3. The check valve of claim 2, wherein the deformation comprises a bead which points toward the interior of the closing body.

4. The check valve of claim 1, wherein the cylindrical section of the pot-shaped closing body is closed.

5. The check valve of claim 1, wherein a free end of the cylindrical section of the pot-shaped closing body is bent inward.

6. The check valve of claim 1, wherein an opening is provided in the closing body for enabling throttled flow when the valve is closed.

7. The check valve of claim 1, wherein:
the valve has a central axis and a passage; and
an outer radius of the housing being reduced in a region of the inlet opening and/or the outlet opening so that the housing is drawn inward towards the central axis of the valve for reducing a cross-section of the passage.

8. The check valve of claim 1, wherein:
the valve has a passage; and
the cage insert being provided with an opening which enlarges a cross-section of the passage in a region adjacent to the outlet opening.

9. The check valve of claim 1, wherein the closing body comprises metal.

10. The check valve of claim 9, wherein the cage insert and the housing comprise metal.

11. The check valve of claim 1, wherein the closing body comprises plastic.

12. The check valve of claim 11, wherein the cage insert and the housing comprise plastic.

13. The check valve of claim 2, wherein the deformation comprises an outwardly curved camber.

14. The check valve of claim 1, wherein the cylindrical section of the pot-shaped closing body comprises at least one slot.

15. The check valve of claim 1, wherein the closing body comprises deep-drawn sheet-metal.

16. A check valve comprising:
a cylindrical hollow housing including axial top and bottom end portions;
a cage insert including axial top and bottom end portions, the insert comprising a plurality of axially extending guide surfaces disposed between the axial top and bottom end portions of the insert, the guide surfaces forming an axially extending internal space;
the insert being disposed within the housing so that the axial top end portion of the insert is positioned against the axial top end portion of the housing, so that the axial bottom end portion of the insert is positioned against the axial bottom end portion of the housing, and so that the insert is axially surrounded by the housing between the top and bottom end portions;
a pot-shaped closing body including a radially extending base portion and a slotted cylindrical wall that axially extends from a radial outer edge of the base portion;
the closing body disposed within the internal space of the insert so that the cylindrical wall extends away from the top end portion of the housing and the closing body is capable of axially sliding within the insert;
wherein the closing body is capable of moving between first and second positions, wherein at the first position, the base portion of the closing body is positioned against the top portion of the housing to form a seal and at the second position, the valve is opened; and
a spring element disposed between the base portion of the closing body and the axial top end portion of the insert for biasing the closing body toward the first position.

17. The valve of claim 16 wherein the plurality of guide surfaces comprises at least three guide surfaces and each of the guide surfaces is capable of simultaneously axially guiding the closing body within the insert.

18. A check valve, comprising:
a housing including an inlet opening at a first end thereof and an outlet opening at a second end thereof in an axial direction;
an insert being disposed in said housing so as to extend substantially between the first end and the second end of the housing, said insert being configured generally as a cage structure presenting guiding sections, said guiding sections being radially spaced apart from one another with spaces being present therebetween along an axial extent thereof for passage of fluid, said guiding sections being axially extended in said housing;
a closing body being received within the insert, said closing body having a tubular configuration including one open end and one closed end, said closed end being oriented to face in a direction of said inlet opening of said housing, said housing including a sealing surface facing a radially outward portion of said closed end of said closing body, said guiding sections presenting inwardly facing guide surfaces along a portion of said axial extent of said guiding sections and including a stop at an end of portion of said axial extent leading to said outlet, said closing body being movably guidable along said guide surfaces between a first end position, in which radially outward portion of said closed end of said closing body is seated against said sealing surface and said valve is closed, and a second end position, in which said valve is opened and a front edge of said open end of said closing body is brought into contact with the stop of said insert and said closed end of said closing body is spaced apart from said sealing surface; and
a spring being received within said insert, said spring being oriented for biasing said closing body into said first end position.

19. The check valve of claim 18, wherein:
the guide surfaces comprise at least three guide surfaces; and
the closing body is simultaneously guidable in the axial direction along the at least three guide surfaces.

20. The check valve of claim 18, wherein the tubular configuration of the closing body includes at least one slot extending parallel to or inclined with respect to the axial direction.

* * * * *